United States Patent [19]
Kumar et al.

[11] Patent Number: 5,990,648
[45] Date of Patent: Nov. 23, 1999

[54] METHOD FOR DETECTING LOCKED-AXLE CONDITIONS WITHOUT A SPEED SENSOR

[75] Inventors: Ajith Kuttannair Kumar; Kevin Michael Jones, both of Erie, Pa.

[73] Assignee: General Electric Company, Erie, Pa.

[21] Appl. No.: 09/239,662

[22] Filed: Jan. 29, 1999

[51] Int. Cl.[6] .................................................. B61C 17/00
[52] U.S. Cl. ...................... 318/490; 104/307; 105/26.05
[58] Field of Search ..................................... 318/459, 490; 388/909; 104/307; 303/121, 122, 122.04, 122.05, 22.4, 22.6, 89; 324/500; 105/26.05, 49, 77, 78, 463.1

[56] References Cited

U.S. PATENT DOCUMENTS

| | | |
|---|---|---|
| 4,071,871 | 1/1978 | Kochem ..................................... 361/27 |
| 4,243,927 | 1/1981 | D'Atre ..................................... 318/803 |
| 4,896,090 | 1/1990 | Balch et al. . |
| 5,480,220 | 1/1996 | Kumar . |
| 5,652,525 | 7/1997 | Mullin et al. ............................. 324/772 |

*Primary Examiner*—Bentsu Ro
*Attorney, Agent, or Firm*—Jill M. Breedlove; Douglas E. Stoner

[57] ABSTRACT

A method for detecting the occurrence of actual locked axle conditions in a vehicle propelled by AC motors includes the steps of detecting a potential locked axle condition, which may be induced due to a faulty speed sensor; setting the frequency of the inverter which controls operation of the AC motor coupled to the potentially locked axle at a predetermined frequency value; varying the level of electromagnetic flux in the motor; measuring torque produced by the motor; and determining based on the measured torque whether or not the potential locked axle condition is an actual locked axle condition.

17 Claims, 8 Drawing Sheets

5,990,648

METHOD FOR DETECTING LOCKED-AXLE CONDITIONS WITHOUT A SPEED SENSOR

BACKGROUND OF THE INVENTION

The present invention is related generally to detection of locked axle conditions and, in particular, to a method for verifying without a speed sensor the occurrence of an actual locked axle condition in a vehicle propelled by AC motors.

Locomotives used for hauling applications are generally equipped with speed sensors coupled to respective traction motors or to the axles driven by the motors. The speed sensor data or information may be used to detect a locked axle condition. If a locked axle condition occurs on a given axle while the locomotive is moving, the rotational speed of that axle decreases to zero, and all other axles rotate at a speed corresponding to the speed of the locomotive. Thus, a locked axle condition can be detected whenever a substantial difference in speed is sensed in one axle relative to the other axles.

In addition, when a speed sensor fails to supply reliable sensor data, a locked axle condition may be indicated in a system controller since existing controllers are not generally capable of detecting speed sensor failures. When a locked axle condition is indicated, the operator generally has to stop the train and visually inspect the axle or wheels for any discernable damage. If the visual inspection does not reveal any useful information, then the train may have to be rolled slightly to ascertain whether in fact the axle is locked or whether the condition was indicated due to a faulty speed sensor. If the latter is true, then the locomotive can be operated at lower speeds until the speed sensor and/or speed detection system can be repaired. Stopping trains, inspecting axles, and operating at lower speeds involve burdensome delays. Thus, there is a need for a low-cost method which will reliably distinguish between an actual locked axle condition and an erroneously detected axle condition, which may be indicated based on speed sensor failure.

BRIEF SUMMARY OF THE INVENTION

A method is provided for detecting the occurrence of actual locked axle conditions, without requiring speed sensors, in a vehicle propelled by AC motors. In one embodiment, the method includes the following steps: detecting a potential locked axle condition, which may be detected due to a faulty speed sensor; setting the frequency of the inverter which controls operation of the AC motor coupled to the potentially locked axle at a predetermined frequency value; varying the level of electromagnetic flux in the motor; measuring torque produced by the motor; and determining based on the measured torque whether or not there is an actual locked axle condition.

In an alternative embodiment, the method can be used for detecting whether an axle in a vehicle propelled by AC motors is rotating near a given speed, which if zero, would be indicative of a locked axle condition. This includes the step of choosing first and second frequency values such that the given speed is substantially centered relative to the first and second frequency values, the two values being sufficiently apart from the given speed so that an AC motor coupled to the axle can generate a sufficiently measurable level of torque. Additional steps include setting an inverter frequency, which controls the AC motor coupled to the axle, at the first frequency value; varying the level of electromagnetic flux in the motor; measuring torque produced by the motor while operating at the first frequency value; setting the inverter frequency at the second frequency value; measuring torque produced by the motor while operating at the second frequency value; and determining based on the respectively measured torques whether the axle is actually rotating near the given speed.

BRIEF DESCRIPTION OF THE DRAWINGS

For a better understanding of the present invention, reference may be had to the following detailed description taken in conjunction with the accompanying drawings in which.

DETAILED DESCRIPTION OF THE INVENTION

Figure 1:
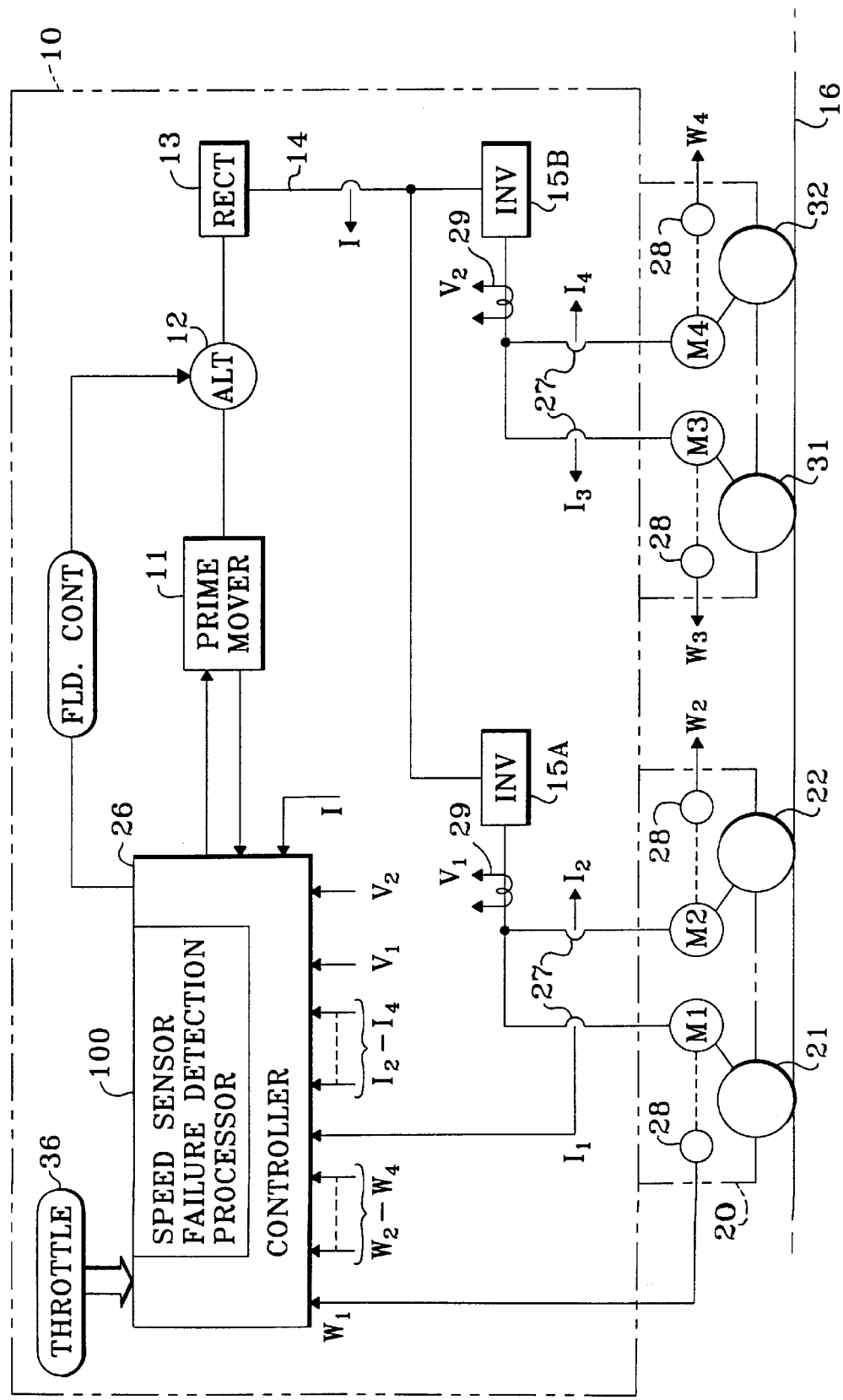
FIG. 1 shows a simplified block diagram of a propulsion system using a processor, such as may be used for executing the present invention.

The present invention may be utilized in various types of alternating current (AC) induction motor powered vehicles such as, for example, transit cars and locomotives. By way of illustration, the invention is described herein as it may be applied to a locomotive. A propulsion system 10 of FIG. 1 includes a variable speed prime mover 11 mechanically coupled to a rotor of a dynamo electric machine 12 comprising a 3-phase alternating current (AC) synchronous generator or alternator. The 3-phase voltages developed by alternator 12 are applied to AC input terminals of a conventional power rectifier bridge 13. The direct current (DC) output of bridge 13 is coupled via DC link 14 to a pair of controlled inverters 15A and 15B which invert the DC power to AC power at a selectable variable frequency. The AC power is electrically coupled in energizing relationship to each of a plurality of adjustable speed AC traction motors M1 through M4. Prime mover 11, alternator 12, rectifier bridge 13 and inverters 15A, 15B are mounted on a platform of the traction vehicle 10, such as a four-axle diesel-electric locomotive. The platform is in turn supported on two trucks 20 and 30, the first truck 20 having two axle-wheel sets 21 and 22 and the second truck 30 having two axle-wheel sets 31 and 32.

Each of the traction motors M1–M4 is hung on a separate axle with its rotor mechanically coupled via conventional gearing in driving relationship to the associated axle-wheel set. In the illustrative embodiment, the two motors M1 and M2 are electrically coupled in parallel with one another and receive power from inverter 15A while motors M3 and M4 are coupled to inverter 15B. However, in some applications, it may be desirable to provide an inverter for each motor or to couple additional motors to a single inverter. Suitable current transducers 27 and voltage transducers 29 are used to provide current and voltage feedback signals respectively representative of the magnitudes of current and voltage in the motor stators. Speed sensors 28 are used to provide speed signals representative of the rotational speeds W1–W4 in revolutions per minute (RPM) of the motor shafts. These rotational speed signals are readily converted to wheel speed in a well known manner. For simplicity, only single lines have been indicated for power flow although it will be apparent that the motors M1–M4 are typically three phase motors so that each power line represents three lines in such applications.

The magnitude of output voltage and current supplied to rectifier bridge 13 is determined by the magnitude of excitation current supplied to the field windings of the alternator 12. The excitation current is set in response to an operator demand (throttle 36) for vehicle speed by the controller 26 which is in turn responsive to actual speed as represented by signals W1–W4. The controller 26 converts the speed command to a corresponding torque command for use in controlling the motors M1–M4. Since AC motor torque is proportional to rotor current and air gap flux, these quantities may be monitored; or, alternatively, other quantities such as applied voltage, stator current and motor RPM may be used to reconstruct motor torque in controller 26. A more detailed analysis of such techniques is given in U.S. Pat. No. 4,243,927 and in a paper published in *IEEE Transactions on Industry Applications*, Vol. IA-13, No. 1, January 1977, entitled "Inverter-Induction Motor Drive For Transit Cars" by Plunkett and Plette.

In an electrical braking or retarding mode of operation, inertia of the moving vehicle is converted into electrical energy by utilizing the traction motors as generators. Motor voltage and current are controlled to set a desired braking effort.

Controller 26 further includes a speed sensor failure detection processor 100 for distinguishing between potential locked-axle conditions and actual locked axle conditions in the presence of faulty sensor data.

Figure 2:
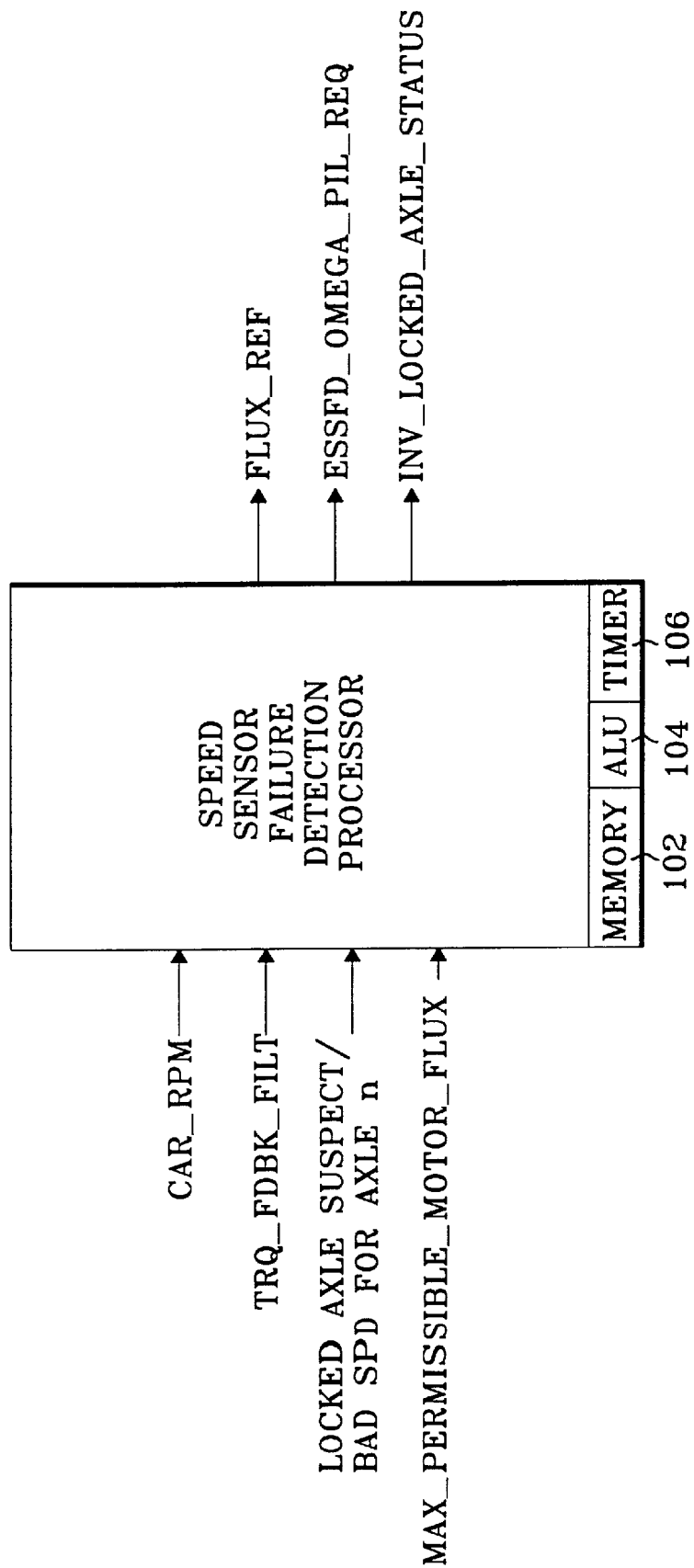
FIG. 2 shows further details in connection with the processor of FIG. 1.

As shown in FIG. 2, processor 100 receives the following input signals: a signal representative of locomotive speed ($car_{13}$ rpm), such as may be readily obtained from one or more radar sensors or other speed sensors connected to axles not suspected of being subject to a locked axle condition; a signal representative of motor torque 10 feedback (trq_fdbk_filt); a signal representative of a potential locked-axle condition LOCKED_AXLE SUSPECT/BAD_SPD_FOR AXLE_n;

and a signal indicative of the maximum flux level (max_permissible_motor_flux) which the processor will be allowed to command according to the method of the present invention. FIG. 2 further shows that processor 100 supplies information in connection with the status of the potentially locked axle. Such information may be displayed by a suitable display (not shown) to inform an operator of the presence of an actual locked axle condition so that appropriate corrective measures can be promptly implemented. In addition, such information may be transmitted to a fault storage unit for maintaining fault history in a given locomotive. Other output signals supplied by processor 100 include a signal representative of a motor speed command (essfd_omega_pll_req) which may be supplied to the inverter driving the motor coupled to the potentially locked axle; and a signal representative of a flux command (flux_ref), which is supplied to the aforementioned inverter. Processor 100 is shown in FIG. 2 as including a memory 102, an arithmetic logic unit 104 and a timer 106.

Figure 3A:
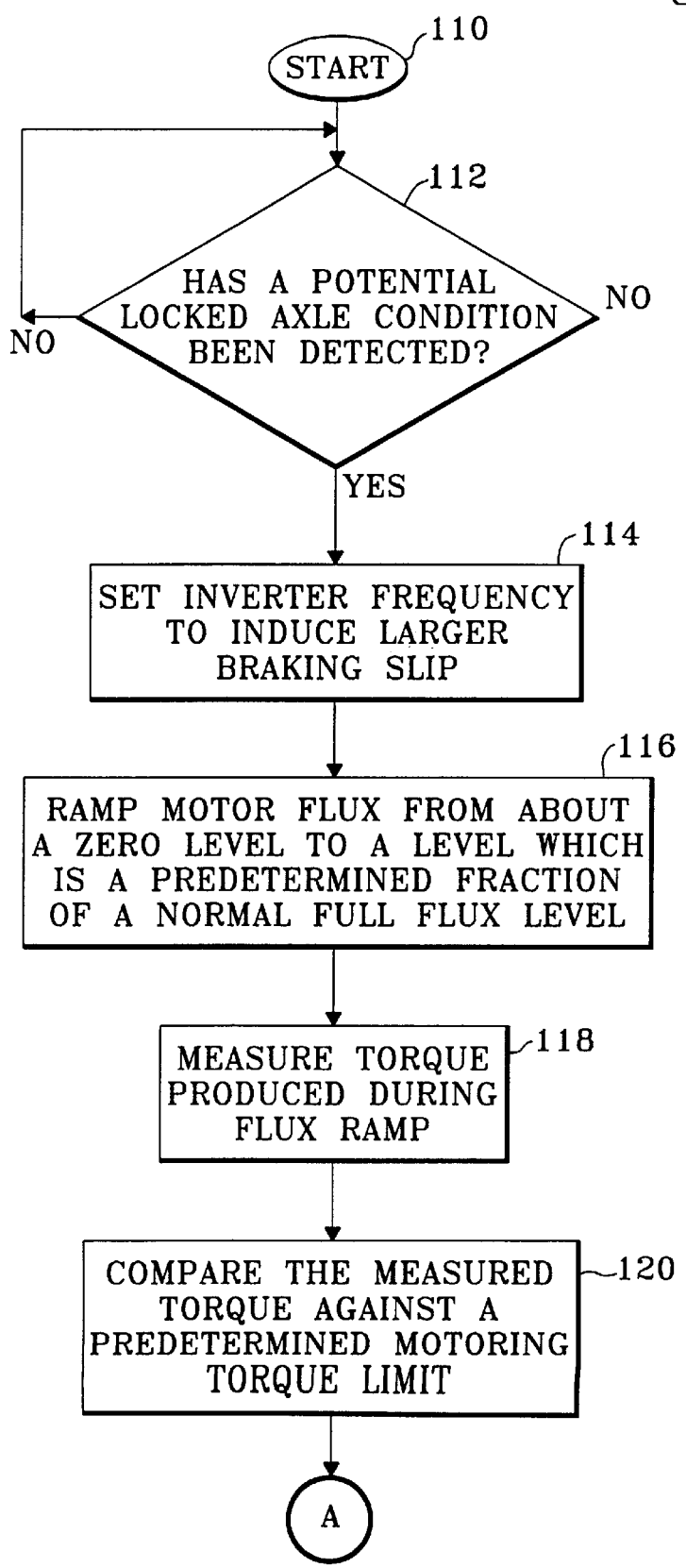
FIGS. 3A–3C collectively show a flow chart of one exemplary embodiment of the detection method of the present invention.
Figure 3B:
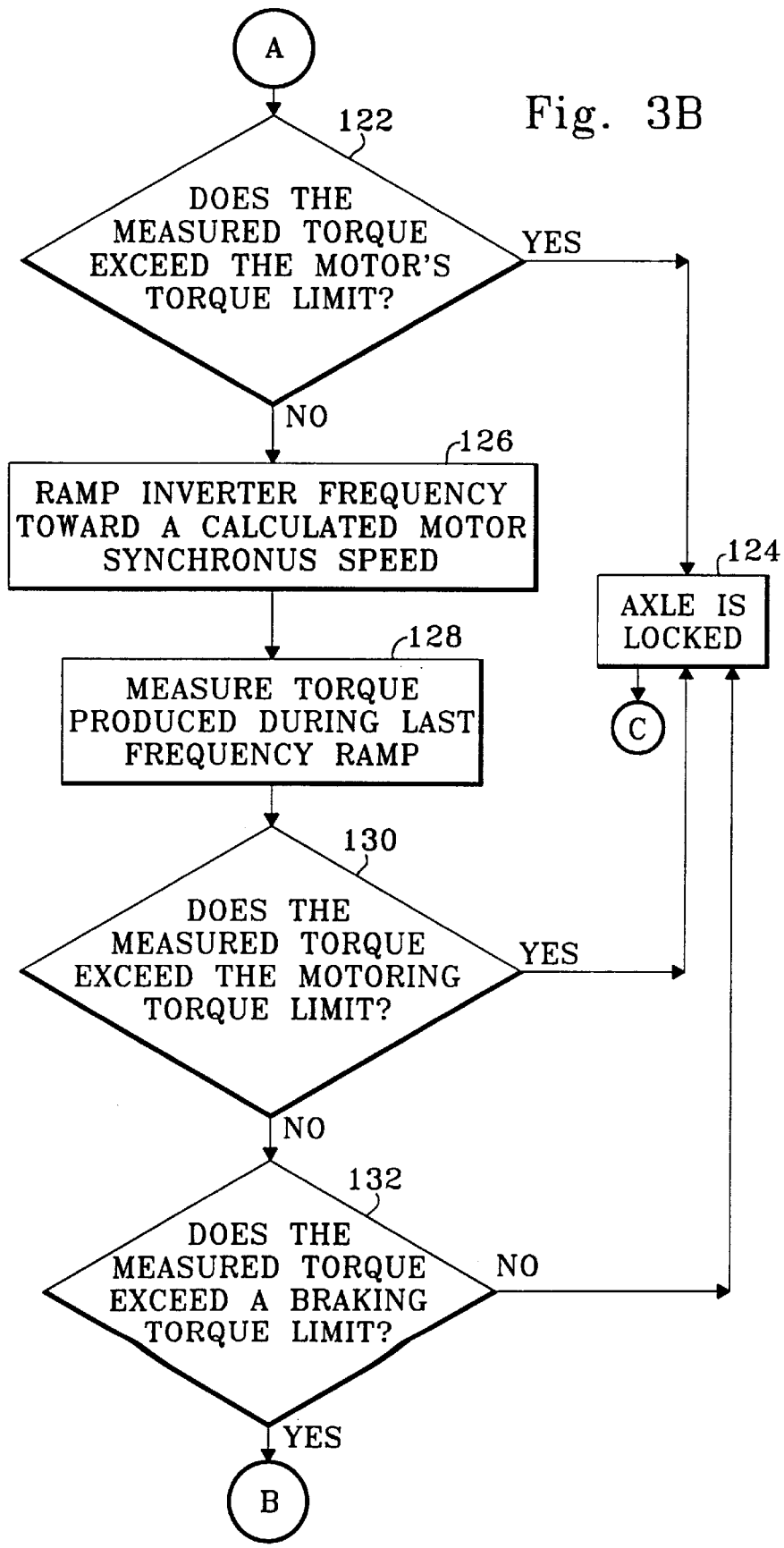
Figure 3C:
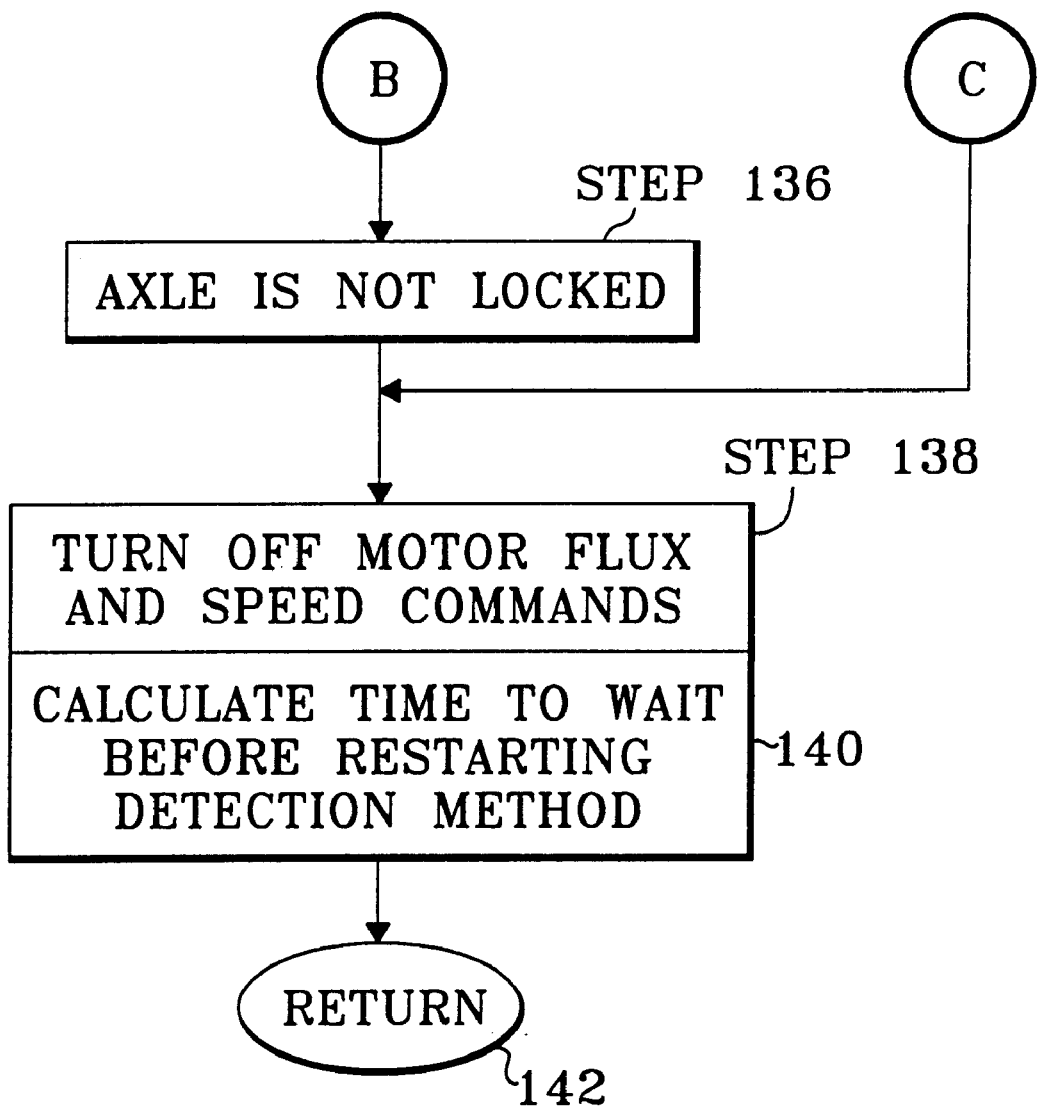

FIGS. 3A–3C, which are interconnected through connecting circles labeled A, B and C, collectively show a flow chart useful for describing one embodiment in accordance with the method of the present invention. In this embodiment, the wheels connected to the suspected locked axle are presumed to be turning freely at or near the locomotive speed. Thus, when a frequency value corresponding to a speed slightly below locomotive speed is applied to the induction motor, if the motor is turning at a speed corresponding to the locomotive speed, then the motor will produce braking torque; and hence a locked axle condition would not be indicated. Conversely, if the axle is locked, then the motor will be at zero speed, and the torque produced by the motor will be a motoring torque.

As illustrated in FIG. 3A, upon start of operations at step 110, a detection step 112 comprises detecting a potential locked axle condition. For example, if the speed sensor value goes to zero while the train is moving, then this could indicate that either the speed sensor has failed or that in fact the axle is locked. The present invention provides for a method to reliably distinguish between either of such conditions without having to stop the train and conduct the various burdensome procedures described above.

Step 114 comprises setting the inverter frequency to a value that is sufficiently low relative to a calculated motor synchronous speed so as to induce a sufficiently large braking slip. Those skilled in the art will appreciate that the calculated synchronous motor speed can be calculated in controller 26 using well known techniques using information regarding wheel diameter, gear ratio and locomotive speed. By way of example, in one application it has been found that setting the inverter frequency to a value equivalent to 200 RPM below the calculated motor synchronous speed is sufficient to induce a relatively large braking slip.

Step 116 comprises varying the level of electromagnetic flux in the motor. The flux variation may occur in the form of ramping the level of flux from a level of about zero to a level which is a predetermined fraction of a full flux level normally used by the motor. Such fractional level flux selection ensures that a high torque is not produced by the traction motor even if the frequency value selected in step 114 is slightly off. By way of example, in that the same application referenced above, the predetermined fractional level was conveniently chosen to have a value of about 10% of the normal full flux level used by the motor.

Step 118 comprises measuring the torque produced during the flux ramping step 116. Step 120 comprises comparing any measured torque, such as motoring torque, against a predetermined motoring torque limit, which may be conveniently stored in circuit memory 102 (FIG. 2). The comparing step can be readily performed in arithmetic logic unit 104 (FIG. 2). As illustrated in FIG. 3B, step 122 allows for making at least an initial determination based on the measured motoring torque as to whether the potential or suspected locked-axle condition is an actual locked axle condition. In particular, if the motoring torque measured in step 120 exceeds the motoring torque limit then this would indicate that the axle is not rotating; and an actual locked axle condition would be indicated in step 124.

If the measured motoring torque does not exceed the motoring torque limit, then step 126 allows for ramping the frequency value toward a value which is close to the calculated motor synchronous speed but is not equal to or above the calculated motor synchronous speed. Step 128 then allows for measuring torque, such as motoring or braking torque produced during frequency ramping step 126. Step 130 allows for comparing whether the measured torque, such as motoring torque, exceeds the motoring torque limit; if it does, then a locked axle condition is indicated in step 124. Step 132 allows for comparing whether the measured torque, such as braking torque, exceeds the braking torque limit which may be conveniently stored in memory 102 (FIG. 2). If the measured braking torque does not exceed the braking torque limit, then step 124 indicates that the axle is locked. However, if the measured braking torque exceeds the braking torque limit, then step 136 indicates that the suspected locked axle condition does not correspond to an actual locked axle condition; i.e., the axle is actually rotating.

Step 138 allows for resetting various signals representative of parameters such as motor flux and speed command. Prior to end of operations in step 142, step 140 allows for calculating, using timer circuit 106 (FIG. 2), a suitable time to wait before restarting the method at step 110.

Figure 4A:
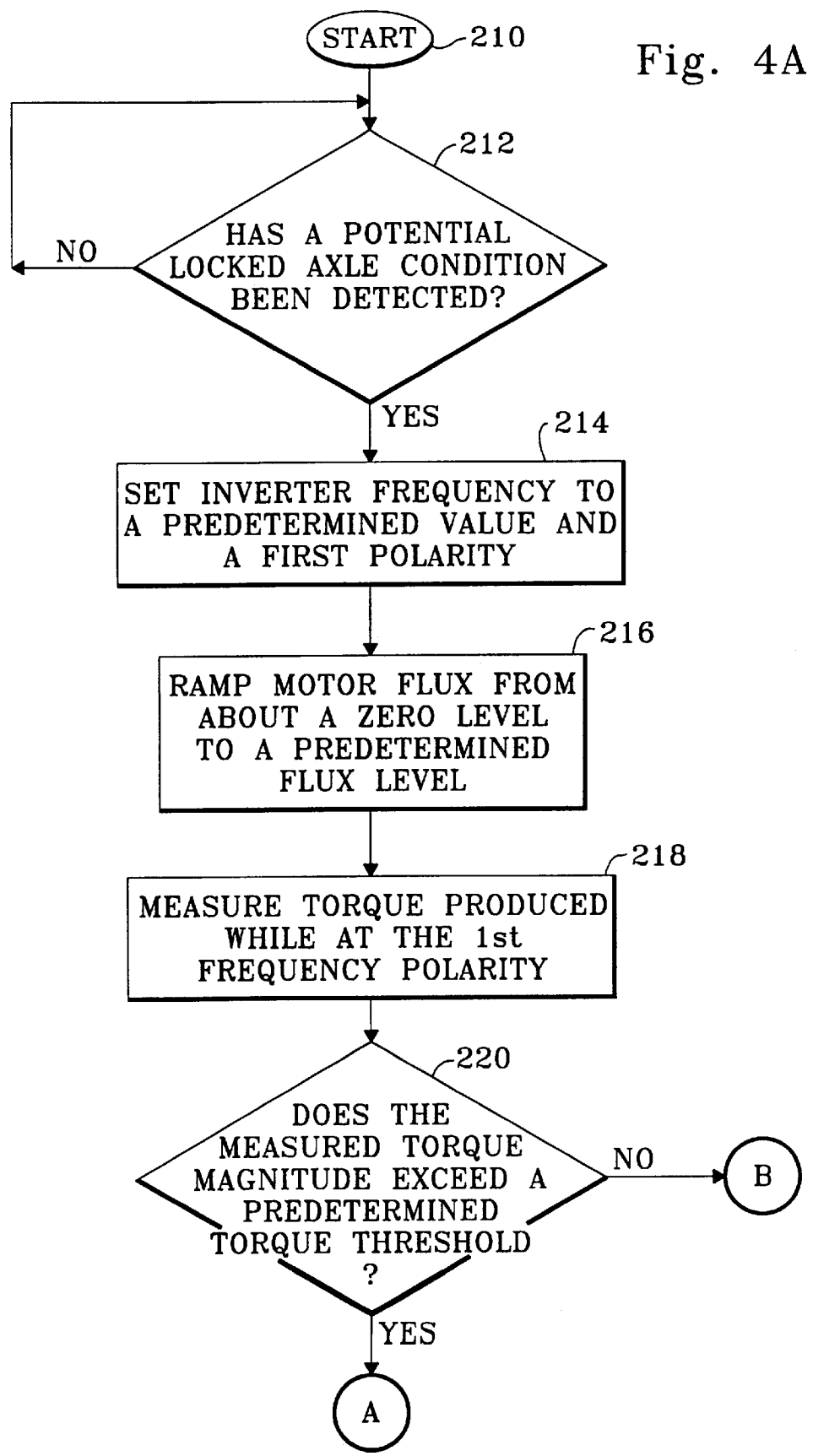
FIGS. 4A–4C collectively show a flow chart of another exemplary embodiment of the detection method of the present invention.
Figure 4B:
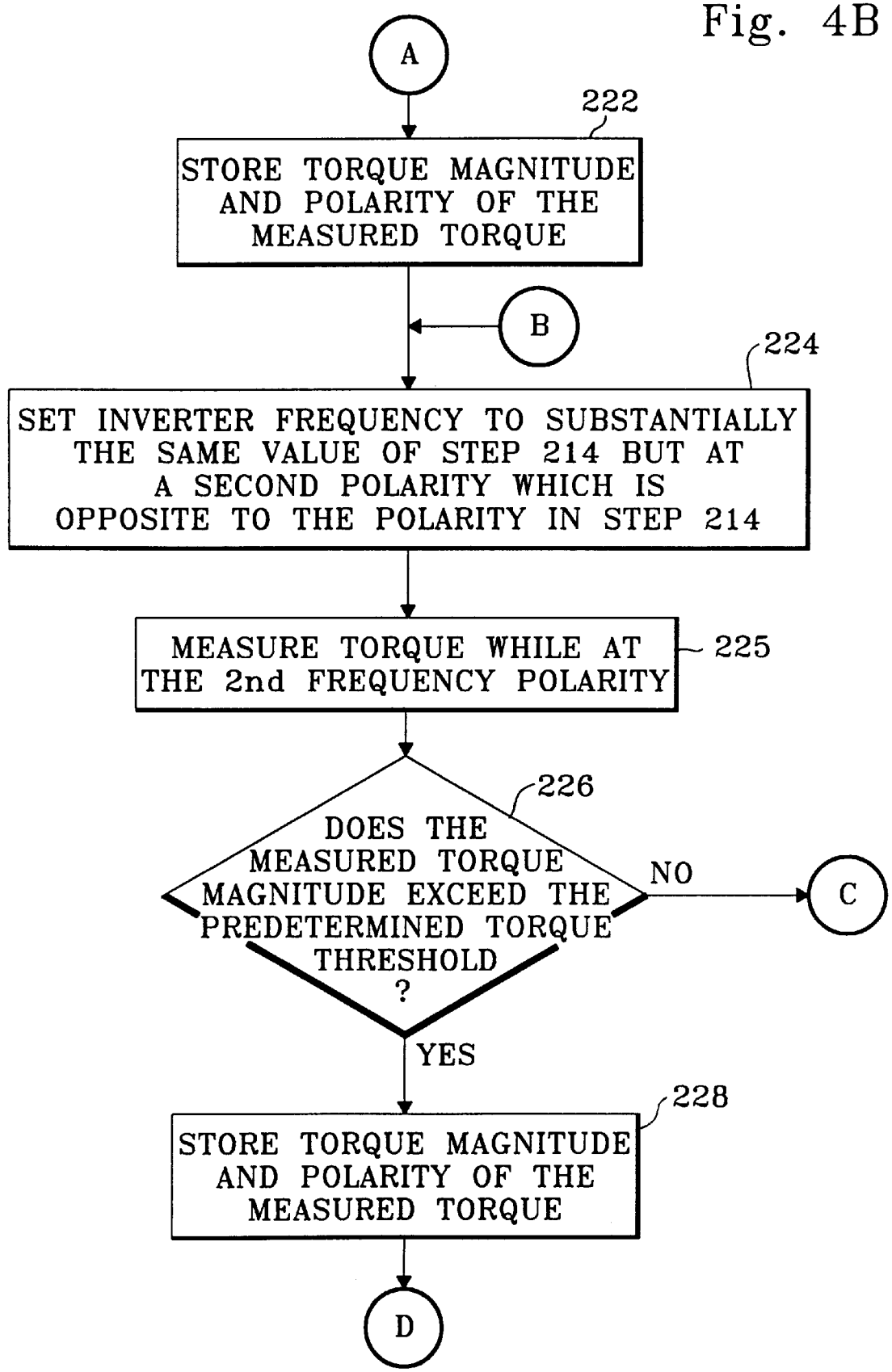
Figure 4C:
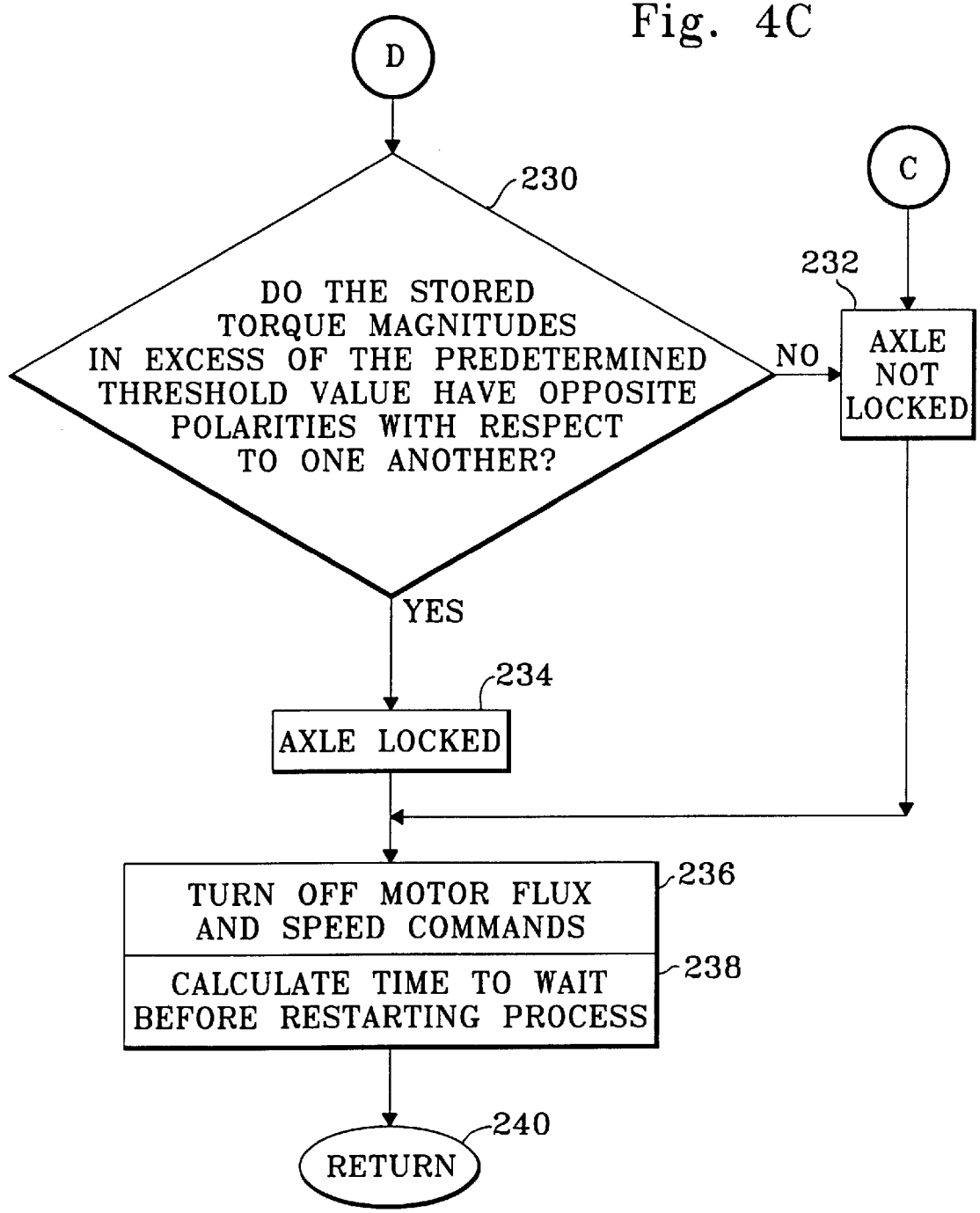

FIGS. 4A and 4B, which are interconnected through connecting circles labeled A–D, collectively show a flow chart which will be used for describing an alternative embodiment in accordance with the method of the present invention. In this other embodiment, the wheels connected to the suspected locked axle are presumed to have zero speed. Thus, when two frequency values having substantially the same small magnitude (relative to the presumed speed, which in this case is zero) but opposite polarity with respect to one another, are applied to the induction motor, if the respective torques produced by the motor have opposite polarity with respect to one another, then the motor speed is within the range defined by the two frequency values; and, in such case, the conclusion would be that the axle is locked. It is noted that the foregoing characteristic is true for any operating frequency of an induction motor; that is, as long as there is torque polarity reversal when the two frequency values are respectively applied, then the motor speed is between the two frequency values. Conversely, if there is no torque polarity reversal, then the motor speed is outside the range defined by the two frequency values; and in such case, the conclusion would be that the axle is not locked.

Upon start of operations at step 210, a detection step 212 allows for detecting a potential locked axle condition, which as discussed above, could be due to a speed sensor failure, even though the axle is actually rotating. Step 214 allows for setting the inverter frequency to a predetermined value and a first frequency polarity. By way of example, in one implementation, the frequency value was selected to about −75 RPM. Step 216 allows for varying the level of electromagnetic flux in the motor. The flux variation may occur in the form of ramping the level of flux from a level of about zero to a predetermined flux level, which as suggested in the context of FIG. 3, is relatively low compared to the full flux level normally used by the motor.

Step 218 allows for measuring the torque produced while the motor is operating at the first frequency polarity. If the torque magnitude exceeds a predetermined threshold value (e.g., 100 lb-ft), as shown in steps 220 and 222, then the magnitude and polarity of the measured torque generated during negative polarity frequency operation are stored. Step 224 allows for setting the inverter frequency to substantially the same value as the value set in step 214 but having a second frequency polarity which is opposite to the first frequency polarity. Thus, in the above-described application, the frequency value is set to about +75 RPM. Step 225 allows for measuring the torque produced by the motor while operating at the second frequency polarity.

If the torque magnitude exceeds the predetermined threshold value (e.g., 100 lb-ft), as shown in steps 226 and 228, then the magnitude and polarity of the measured torque generated during positive polarity frequency operation are stored. Step 230 allows for comparing the polarity of the torque values in excess of the predetermined threshold torque value. If the respective torque polarities are not opposite to one another, then step 232 indicates that the axle is not locked; that is, the motor is freely rotating at a speed outside the range from about −70 RPM to about +70 RPM, and hence the axle driven by that motor is not in a locked axle condition. If the respective torque polarities are opposite to one another, then step 234 indicates an actual locked axle condition since the speed of the motor is within the +/−70 RPM range. Step 236 allows for resetting various parameters, such as motor flux and speed command. Prior to the end of operations in step 240, step 238 allows for calculating the time to wait before restarting the detection algorithm at step 210.

It will be appreciated by those skilled in the art that this alternative embodiment is not limited to detection of axle rotation about a zero speed since any given rotational speed of the axle may be conveniently detected, without use of a speed sensor coupled to that axle, by choosing suitable first and second inverter frequency values. For example, if the given speed is 100 RPM, then one could choose a first frequency value of about 30 RPM and a second frequency value of about 170 RPM to verify whether in fact the axle is rotating near 100 RPM.

It will be understood that the specific embodiments of the invention shown and described herein are exemplary only. Numerous variations, changes, substitutions and equivalents will now occur to those skilled in the art without departing from the spirit and scope of the present invention. Accordingly, it is intended that all subject matter described herein and shown in the accompanying drawings be regarded as illustrative only and that the scope of the invention be solely determined by the appended claims.

What is claimed is:

1. A method for detecting the occurrence of an actual locked-axle condition in a vehicle propelled by AC motors, the steps of said method comprising:

detecting a potential locked axle condition;

setting the frequency of an inverter which controls an AC motor coupled to the potentially locked axle to a predetermined frequency value;

varying the level of electromagnetic flux in the motor coupled to the potentially locked axle;

measuring torque produced by the motor during the flux varying step; and determining based on the measured torque whether the potential locked-axle condition is an actual locked axle condition.

2. The method of claim 1 wherein the predetermined frequency value is sufficiently low relative to a calculated motor synchronous speed so as to induce a sufficiently large braking slip.

3. The method of claim 2 wherein the varying step comprises ramping up the level of electromagnetic flux from a flux level of approximately zero to a predetermined flux level which is low compared to a flux level normally used by the motor.

4. The method of claim 3 wherein the torque measuring step comprises measuring torque produced by the motor while the flux ramping step is performed.

5. The method of claim 4 wherein the determining step comprises comparing the measured torque against a predetermined motoring torque limit.

6. The method of claim 5, further comprising the step of ramping the inverter frequency value from the predetermined value to a frequency value which is below a calculated motor synchronous speed.

7. The method of claim 6, further comprising the steps of measuring torque produced by the motor in the frequency ramping step; and comparing the torque measured in the frequency ramping step to the predetermined motoring torque limit and a predetermined braking torque limit.

8. A method for detecting the occurrence of an actual locked-axle condition in a vehicle propelled by AC motors, the steps of said method comprising:

detecting a potential locked axle condition;

setting the frequency of an inverter which controls an AC motor coupled to the potentially locked axle to a predetermined first frequency value at a first frequency polarity;

varying the level of electromagnetic flux in the motor;

measuring torque produced by the motor while operating at the predetermined frequency value and first polarity;

setting the inverter frequency to a second value which is substantially the same as said predetermined first frequency value and at a second frequency polarity opposite to the first polarity;

measuring torque produced by the motor while operating at the second frequency value and polarity; and determining based on the respective values of torque measured during the measuring steps whether the potential locked-axle condition is an actual locked axle condition.

9. The method of claim 8 wherein the level of electromagnetic flux in the varying step is ramped up from a flux level of approximately zero to a predetermined flux level.

10. The method of claim 9, further comprising the steps of storing the magnitude and polarity of the torque measured at the first polarity whenever the magnitude of the measured torque exceeds a predetermined threshold value.

11. The method of claim 10, further comprising the steps of storing the magnitude and polarity of the torque measured at the second polarity whenever the magnitude of the measured torque exceeds the predetermined threshold value.

12. The method of claim 11, further comprising comparing the polarities of the respective stored torque values and indicating an actual locked axle condition if the polarities are opposite to each other.

13. A method for detecting, without a speed sensor, whether an axle in a vehicle propelled by AC motors is rotating at or near a given speed, the steps of said method comprising:

choosing first and second frequency values such that the given speed is substantially centered relative to the first and second frequency values, the first and second frequency values being sufficiently apart from the given speed such that an AC motor coupled to the axle can generate a sufficiently measurable level of torque;

setting the frequency of an inverter controlling the AC motor coupled to the axle to the first frequency value;

varying the level of electromagnetic flux in the motor;

measuring torque produced by the motor while operating at the first frequency value;

setting the inverter frequency to the second frequency value;

measuring torque produced by the motor while operating at the second frequency value; and determining based on the respective values of torque measured during the measuring steps whether the axle is rotating near the given speed.

14. The method of claim 13 wherein the level of electromagnetic flux in the varying step is ramped up from a flux level of approximately zero to a predetermined flux level.

15. The method of claim 14, further comprising the steps of storing the magnitude and polarity of the torque measured at the first frequency value whenever the magnitude of the measured torque exceeds a predetermined threshold value.

16. The method of claim 15, further comprising the steps of storing the magnitude and polarity of the torque measured at the second frequency value whenever the magnitude of the measured torque exceeds the predetermined threshold value.

17. The method of claim 16, further comprising comparing the polarities of the respective stored torque values such that if the polarities of the respective stored torque values are opposite to each other, then the axle is rotating near the given speed.

* * * * *